United States Patent
Padro et al.

(10) Patent No.: US 12,542,251 B2
(45) Date of Patent: Feb. 3, 2026

(54) PORTABLE GROUND FAULT CIRCUIT INTERRUPTER AND/OR ARC FAULT CIRCUITRY INTERRUPTER AND METHOD OF OPERATING THE SAME

(71) Applicant: Hubbell Incorporated, Shelton, CT (US)

(72) Inventors: Kenny Padro, Hamden, CT (US); John E. Brower, Fairfield, CT (US); Brandon Pearce, Bethany, CT (US); Antonio Di Vita, Shelton, CT (US); Matthew Jared Varney, New Britain, CT (US); William Vernon Miller, III, Aldie, VA (US); Joseph Michael Meady, Stratford, CT (US); David Peck, Danbury, CT (US)

(73) Assignee: Hubbell Incorporated, Shelton, CT (US)

( * ) Notice: Subject to any disclaimer, the term of this patent is extended or adjusted under 35 U.S.C. 154(b) by 613 days.

(21) Appl. No.: 17/939,675

(22) Filed: Sep. 7, 2022

(65) Prior Publication Data

US 2023/0075542 A1 Mar. 9, 2023

Related U.S. Application Data

(60) Provisional application No. 63/241,721, filed on Sep. 8, 2021.

(51) Int. Cl.
  *H01H 83/04* (2006.01)
  *H01H 83/20* (2006.01)
  *H02H 1/00* (2006.01)

(52) U.S. Cl.
  CPC ............ *H01H 83/04* (2013.01); *H01H 83/20* (2013.01); *H02H 1/0015* (2013.01); *H01H 2083/201* (2013.01)

(58) Field of Classification Search
  CPC .. H01H 83/04; H01H 83/20; H01H 2083/201; H02H 1/0015; H01R 13/7135; H02G 3/065
  See application file for complete search history.

(56) References Cited

U.S. PATENT DOCUMENTS 5,661,623 A * 8/1997 McDonald ............ H01H 83/02
                                                                        361/45
6,122,155 A   9/2000 Aromin et al.
(Continued)

FOREIGN PATENT DOCUMENTS

DE    26 18 347 A1   11/1977
EP    0 203 269 B1   11/1991
(Continued)

OTHER PUBLICATIONS

European Search Report dated Jan. 16, 2025 for corresponding European Application No. 22868002.1.
(Continued)

*Primary Examiner* — Dharti H Patel
(74) *Attorney, Agent, or Firm* — Michael Best & Friedrich LLP

(57) ABSTRACT

A module of an AM/PD device including a PCB and a bus bar including one or more bus bar contacts. The module further including one or more contact arms having one or more moveable contacts configured to be in a first position and a second position, wherein when in the first position the one or more moveable contacts are in physical contact with the one or more bus bar contacts and when in the second position the one or more moveable contacts are physically separated from the one or more bus bar contacts. The module further including a coil assembly coupled to an actuating device, the actuating device coupled to the one or more contact arms. Wherein the coil assembly, via the actuating (Continued)

device, moves the one or more moveable contacts from the first position to the second position.

8 Claims, 18 Drawing Sheets

(56) References Cited

U.S. PATENT DOCUMENTS

| | | | | |
|---|---|---|---|---|
| 8,514,529 | B1* | 8/2013 | McMahon | H02H 3/338 |
| | | | | 361/42 |
| 9,466,971 | B2 | 10/2016 | Aromin | |
| 2012/0052702 | A1 | 3/2012 | Zou | |
| 2013/0278361 | A1* | 10/2013 | Weeks | H02G 3/10 |
| | | | | 335/6 |
| 2015/0085405 | A1 | 3/2015 | Liu et al. | |
| 2015/0214719 | A1* | 7/2015 | Aromin | H01R 13/7135 |
| | | | | 361/42 |
| 2017/0263405 | A1* | 9/2017 | Bonasia | H01R 13/6633 |
| 2019/0165567 | A1 | 5/2019 | Aromin | |
| 2019/0181594 | A1 | 6/2019 | Ridgeway et al. | |
| 2021/0159690 | A1* | 5/2021 | Sorenson | H04L 67/125 |
| 2021/0226389 | A1* | 7/2021 | Di Vita | H01R 25/006 |

FOREIGN PATENT DOCUMENTS

| | | | | |
|---|---|---|---|---|
| GB | 2 238 921 A | | 6/1991 | |
| WO | 2019/113329 A1 | | 6/2019 | |
| WO | WO-2021150696 A1 * | | 7/2021 | H01R 24/78 |

OTHER PUBLICATIONS

PCT/US2022/042767 International Search Report and Written Opinion dated Jan. 31, 2023 (11 pages).

International Preliminary Report on Patentability (IPRP) dated Jan. 31, 2023 for corresponding International Application No. PCT/US2022/042767.

Extended European Search Report dated Jan. 16, 2025 for corresponding European Application No. 24200852.2.

* cited by examiner

PORTABLE GROUND FAULT CIRCUIT INTERRUPTER AND/OR ARC FAULT CIRCUITRY INTERRUPTER AND METHOD OF OPERATING THE SAME

RELATED APPLICATIONS

This application claims priority to U.S. Provisional Patent Application No. 63/241,721, filed Sep. 8, 2021, the entire contents of which are incorporated herein by reference.

FIELD

Embodiments relate to auto-monitoring/power denial (AM/PD) devices, and more specifically, portable AM/PD devices.

SUMMARY

One embodiment provides a module of a circuit interrupting device. The module includes a printed circuit board (PCB) and a bus bar located on the PCB. The bus bar includes one or more bus bar contacts. The module further includes one or more contact arms having one or more moveable contacts configured to be in a first position and a second position, wherein when in the first position the one or more moveable contacts are in physical contact with the one or more bus bar contacts and when in the second position the one or more moveable contacts are physically separated from the one or more bus bar contacts. The module further includes a coil assembly located on the PCB, the coil assembly is coupled to an actuating device, wherein the actuating device is coupled to the one or more contact arms. Wherein the coil assembly, via the actuating device, moves the one or more moveable contacts from the first position to the second position.

Another embodiment provides a portable circuit interrupting device including a housing having a bottom portion. The portable circuit interrupting device further includes one or more plugs. Wherein the bottom portion of the housing includes a threaded portion configured to receive a cap and an aperture configured to receive a power cable. Wherein the threaded portion includes a compression tab configured to compress the power cable as the threaded portion receives the cap.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
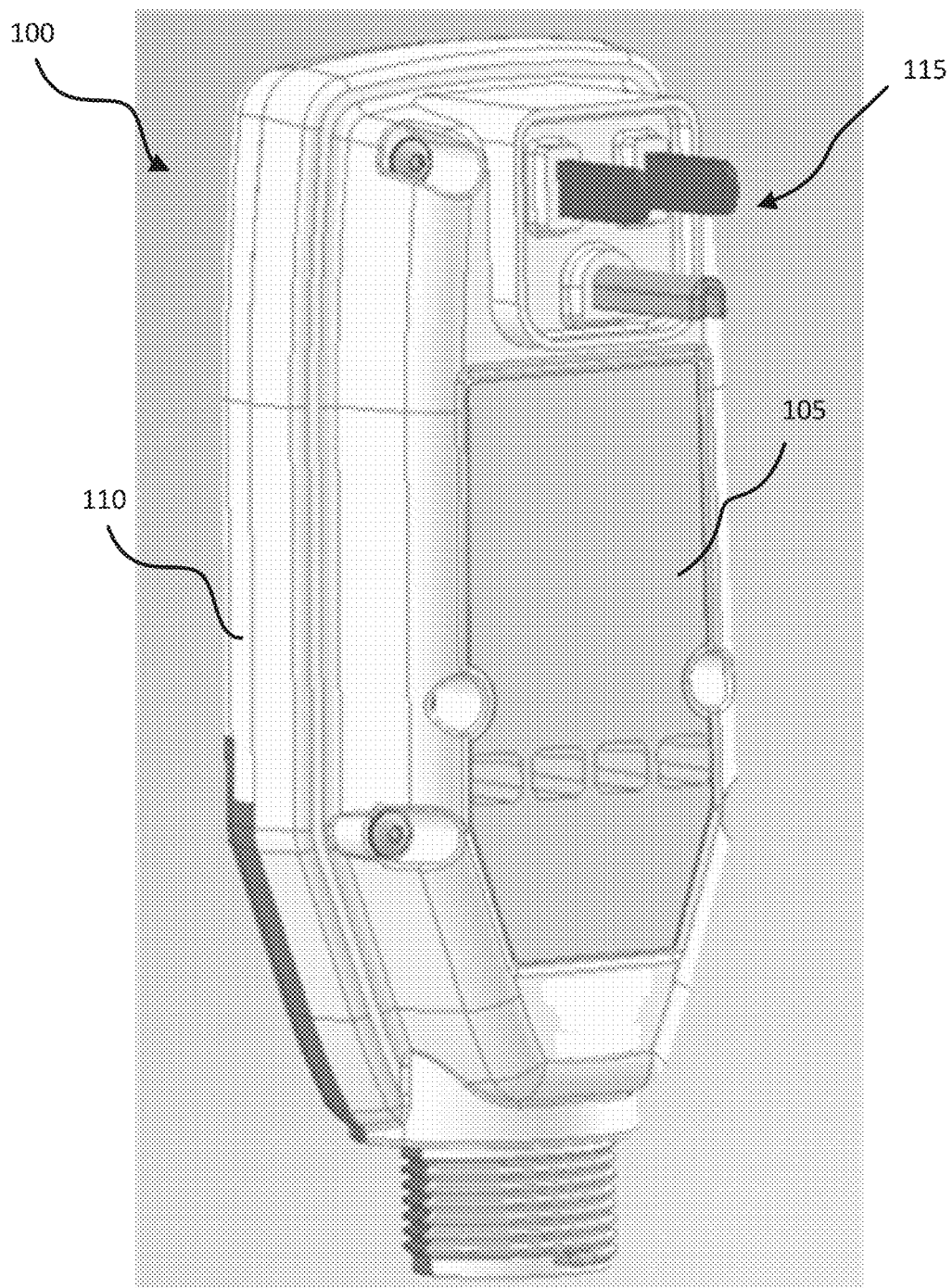
FIG. 1 is a rear perspective view of a AM/PD device according to some embodiments.
Figure 2:
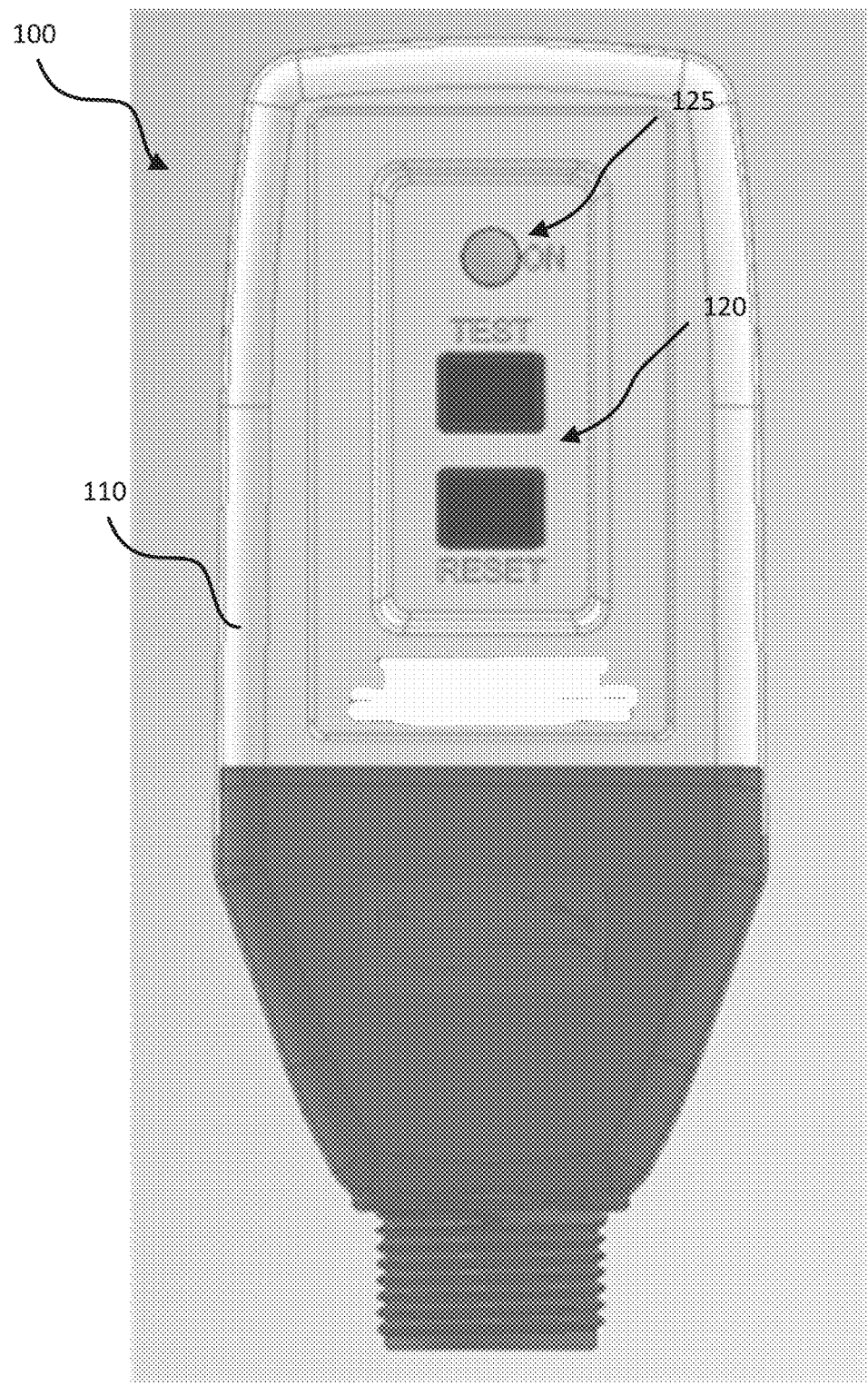
FIG. 2 is a front view of the AM/PD device of FIG. 1 according to some embodiments.
Figure 3:
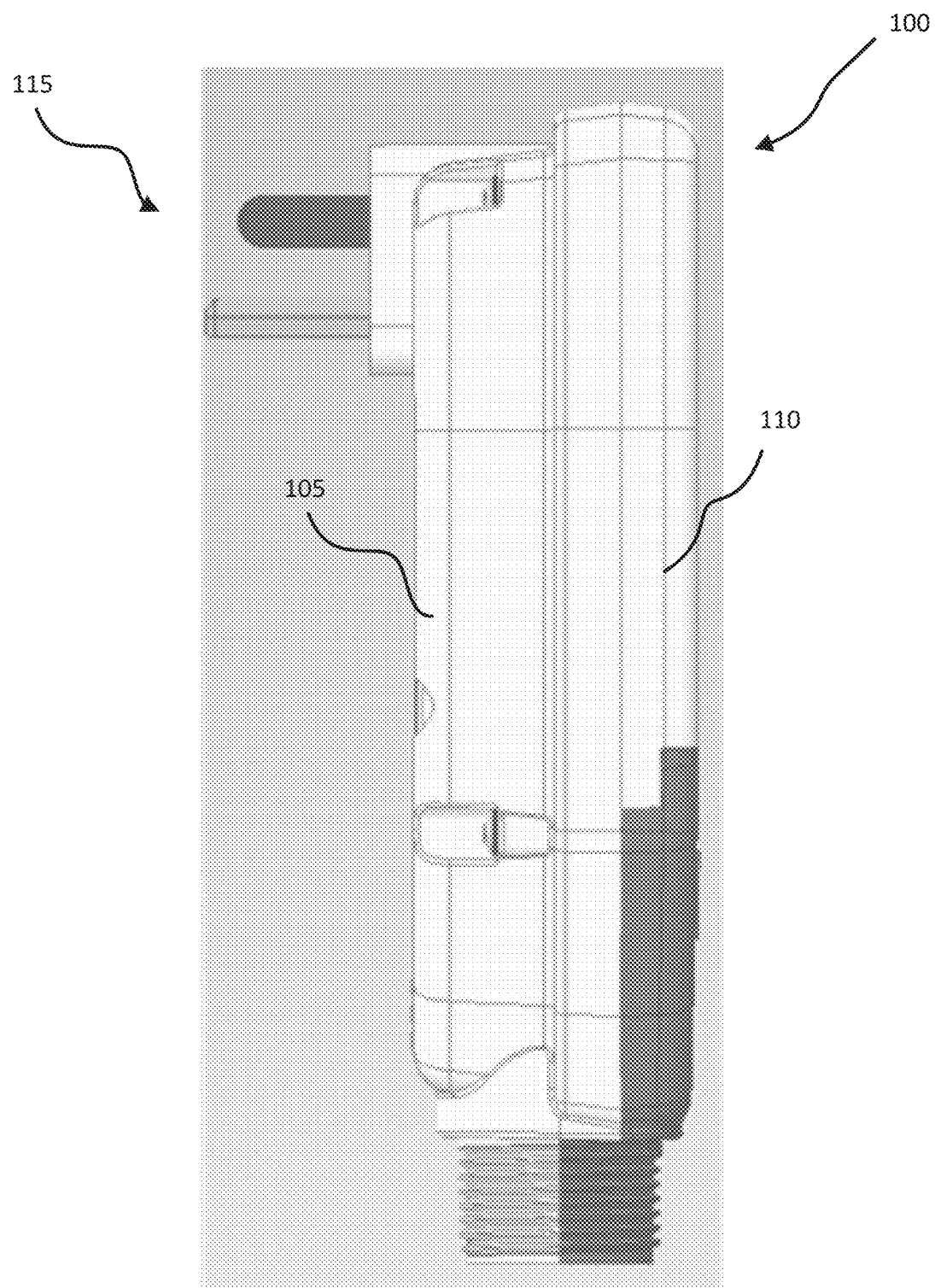
FIG. 3 is a side view of the AM/PD device of FIG. 1 according to some embodiments.

FIGS. 1-3 illustrate an auto-monitoring/power denial (AM/PD) device 100 according to some embodiments. As illustrated, in some embodiments, the device 100 is a portable AM/PD device. Additionally, in some embodiments, the AM/PD devices disclosed herein may incorporate ground fault circuit interrupting (GFCI) features and/or arc fault circuit interrupting (AFCI) features. Furthermore, in some embodiments, the AM/PD devices (and features) disclosed herein may be incorporated into generator units and/or in-wall units.

The AM/PD device 100 may include a rear or base housing 105 and a front housing 110. In the illustrated embodiment, the rear housing 105 includes one or more electrical plugs 115 configured to be received by an electrical outlet.

As illustrated in FIG. 2, the rear housing 105 may include apertures configured to receive one or more user-actuated inputs 120 (for example, buttons such as a TEST button and/or a RESET button) and one or more indicators 125.

Figure 4:
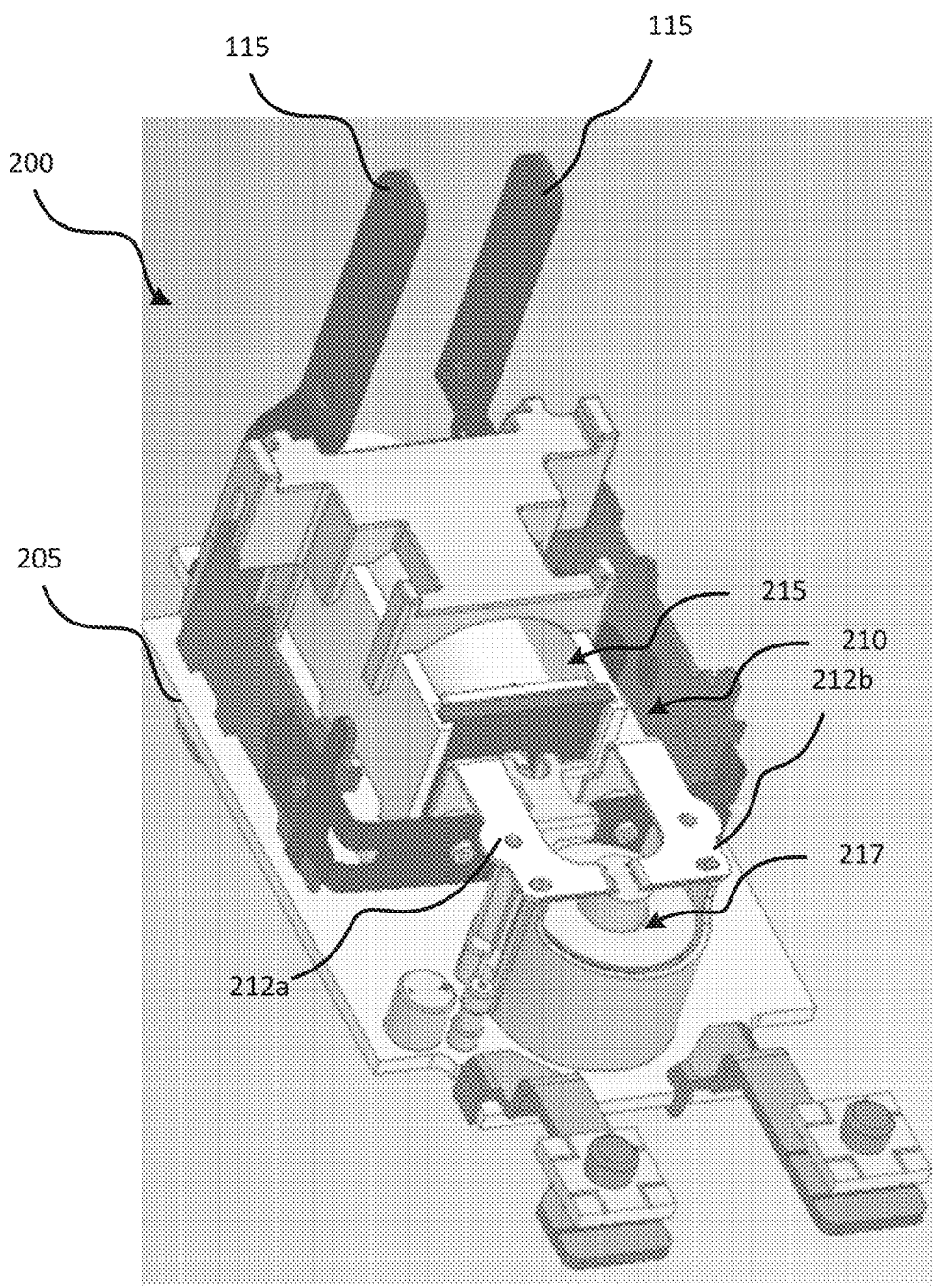
FIG. 4 is a top perspective view of a module of the AM/PD device of FIG. 1 according to some embodiments.

FIG. 4 illustrates a module 200 of the AM/PD device 100 with the rear housing 105 and the front housing 110 removed for illustrative purposes, according to some embodiments. The module 200 includes a primary printed circuit board (PCB), or primary board, 205. The primary board 205 provides control and physical support for most of the working components included in the AM/PD device 100. For example, a top surface of the primary board 205 provides support for an interrupting device 210, which is operable to trigger a self-test detailed below.

Figure 8:
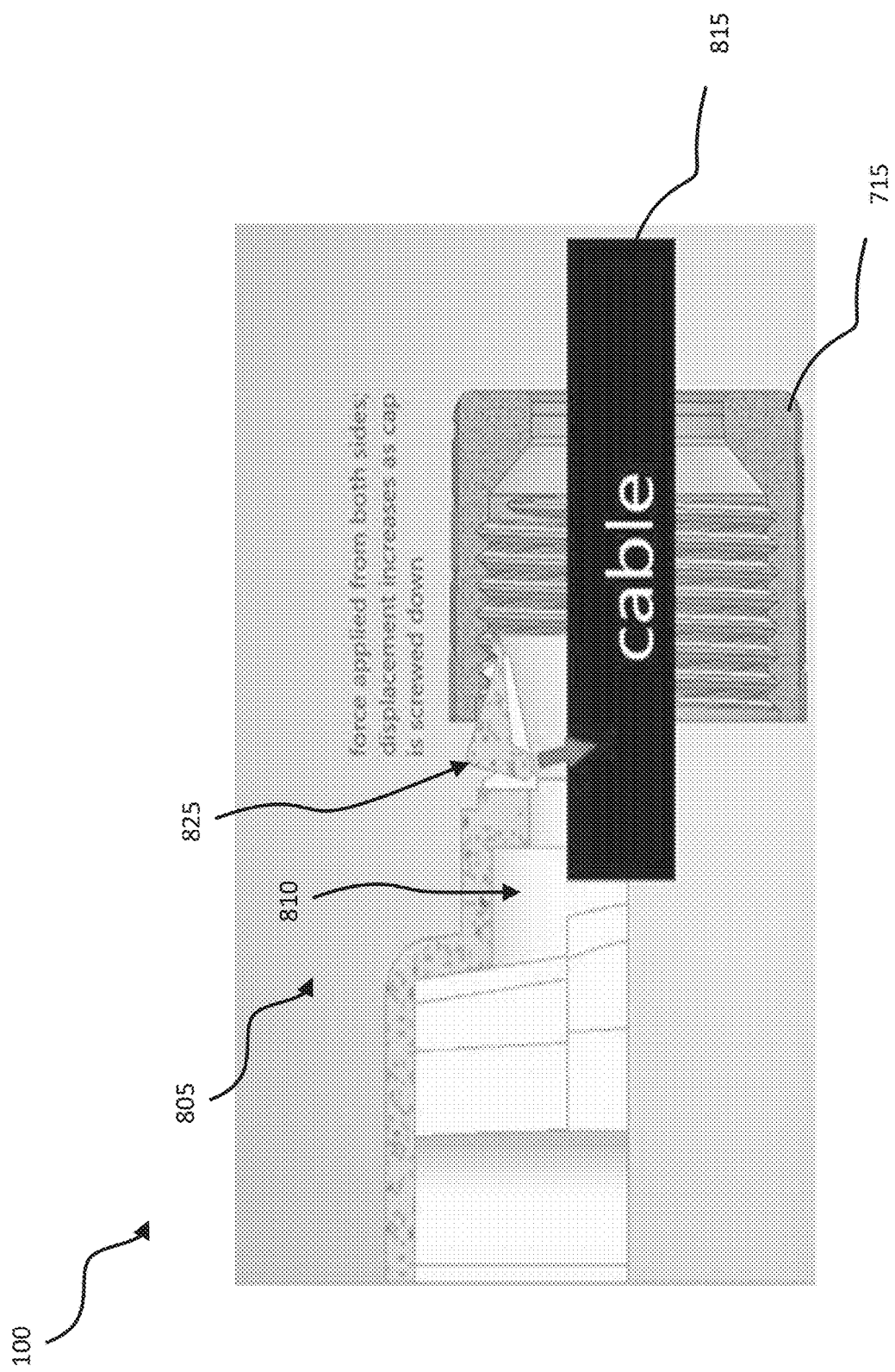
FIG. 8 is a cutaway view of a bottom portion of the AM/PD device of FIG. 1 according to some embodiments.

The interrupting device 210 may be configured to interrupt an electrical connection between the line (for example, via the one or more electrical plugs 115) to the load (for example, via power cable 815 of FIG. 8). In the illustrated embodiment, the interrupting device 210 may include contact arms 212 (including a first contact arm 212a and a second contact arm 212b) for providing the electrical connection between the line (for example, via the one or more electrical plugs 115) and the load (for example, via power cable 815 of FIG. 8). In operation (and as detailed below), when a fault is detected (for example, via control system 600), the contact arms 212a and 212b are biased away from respective contacts.

The module 200 and/or the interrupting device 210 may further include a coil assembly 215 having one or more coils. In some embodiments, the coil assembly 215 is physically supported by the primary PCB 205.

The module 200 may further include one or more sense transformers 217 configured to sense one or more electrical characteristics (for example, a current) through contact arms 212 (and thus an electrical characteristic from the line to the load).

Figure 5:
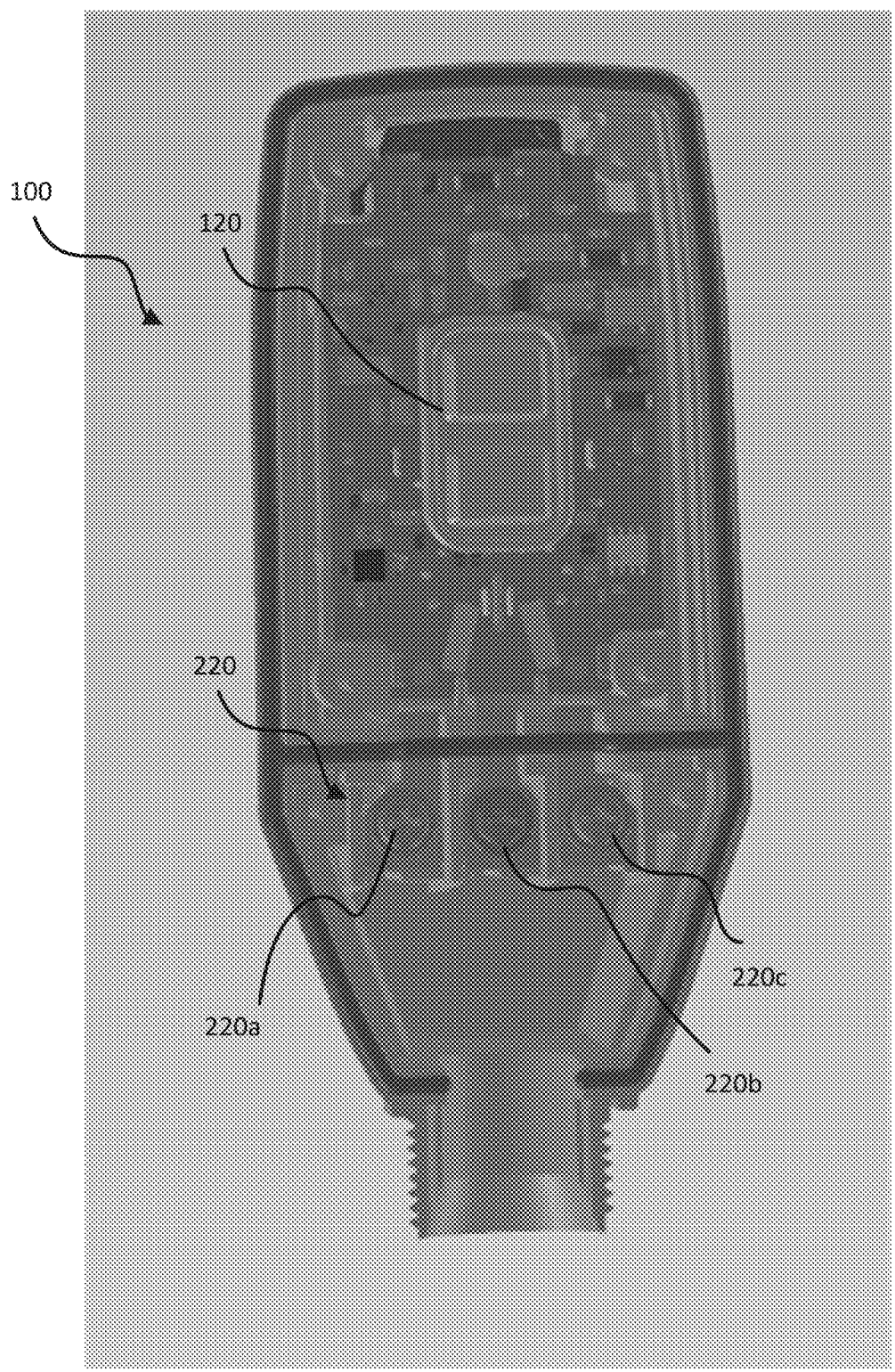
FIG. 5 is a front view of the AM/PD device of FIG. 1 according to some embodiments, with both rear housings removed for illustrative purposes.

FIG. 5 illustrates the module 200 of the AM/PD device 100 with the front housings 110 removed for illustrative purposes, according to some embodiments. As illustrated, the primary board 205 may further provide support for the user-actuated inputs 120, as well as power inputs 220 including a line neutral input 220a, a ground input 220b, and a line hot input 220c. The power inputs 220 are configured to electrical connect to the corresponding line, neutral, and ground of a power cable. In other embodiments, for example GFCI/AFCI devices configured to receive power cables for 240V power, the GFCI/AFCI device may have more power inputs 220.

Figure 6:
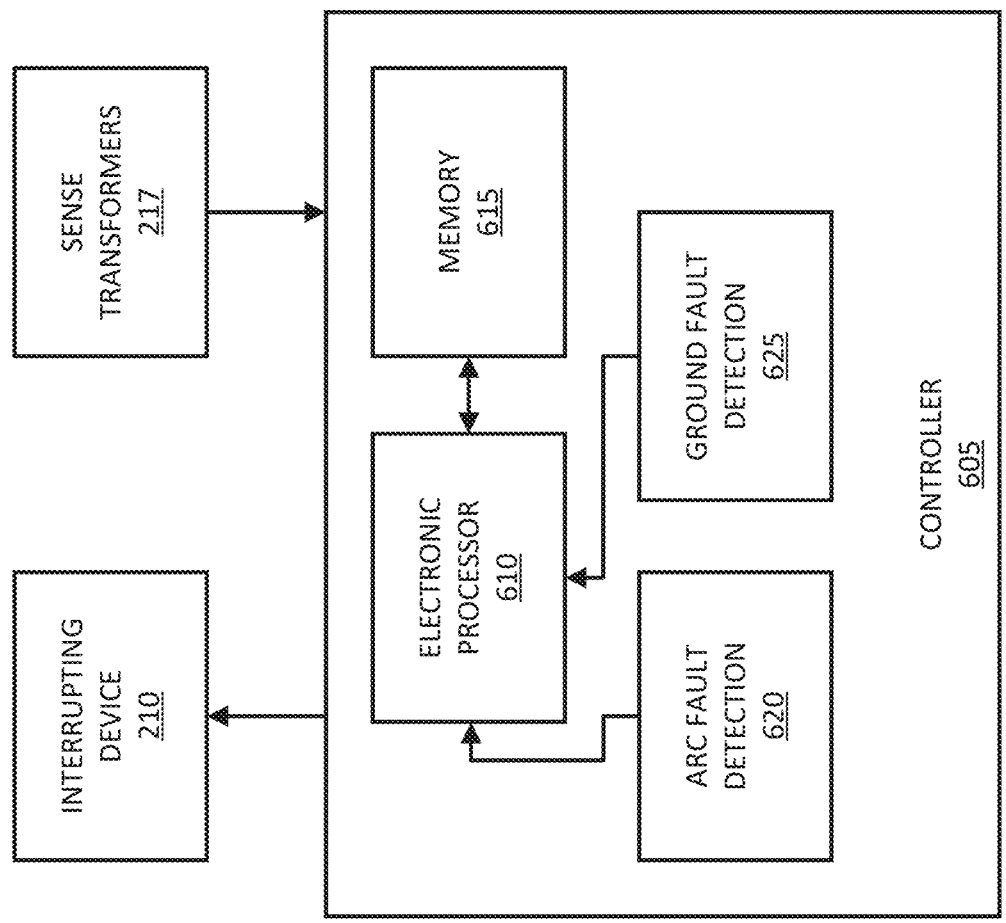
FIG. 6 is a block diagram of a control system of the AM/PD device of FIG. 1 according to some embodiments.
Figure 6:
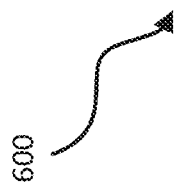

The primary PCB 205 may further include a plurality of surface mounted components, including one or more circuit components and/or a control circuit 600 (illustrated as a block diagram in FIG. 6). The control circuit 600 is configured to provide sensing and/or operational control over the AM/PD device 100. The control circuit 600 may include a controller 605. The controller 605 is electrically and/or communicatively connected to a variety of modules or components of the AM/PD device 100. For example, the controller 605 is connected to the interrupting device 210 and the coil assembly 215.

In some embodiments, the controller 605 includes a plurality of electrical and electronic components that provide power, operational control, and protection to the components and modules within the controller 605 and/or the AM/PD device 100. For example, the controller 605 includes, among other things, an electronic processor 610 (for example, a microprocessor or another suitable programmable device) and memory 615.

The memory 615 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 610 is communicatively coupled to the memory 615 and executes software instructions that are stored in the memory 615, or stored on another non-transitory computer readable medium such as another memory or a disc. The software may include one or more applications, program data, filters, rules, one or more program modules, and other executable instructions.

In the illustrated embodiment, the controller 605 further includes an arc fault detection circuit 620. Although illustrated as being part (or a function block) of the controller 605, in other embodiments, the arc fault detection circuit 620 may be a separate component, removed from the controller 605. In such an embodiment, the arc fault detection circuit 620 may still be electrical and/or communicative communication with the controller 605.

The arc fault detection circuit 620 is configured to analyze electrical signals output by the sense transformer(s) 217. Moreover, the arc fault detection circuit 620 is configured to determine whether an arc fault has occurred based on the analysis of electrical signals received from the sense transformer(s) 217. In some embodiments, the arc fault detection circuit 620 is configured to transmit a signal indicative of the occurrence of an arc fault. In such embodiments, the controller 605 may be configured to trip the AM/PD device 100 in response to receiving the arc fault detection signal. For example, the controller 605 may control the interrupting device 210 (for example, to interrupt the flow of line power from the line terminal to the load terminal, such as by interrupting the flow of power from the power cable to the electrical plugs) in response to receiving the arc fault detection signal In some embodiments, the arc fault detection circuit 620 is further configured to perform an AFCI self-test. In such embodiments, the arc fault detection circuit 620 is configured to report the results of the AFCI self-test to the controller 605. In some embodiments, the arc fault detection circuit 620 is configured to perform the AFCI self-test periodically, intermittently, and/or on an on-demand basis. In some embodiments, the AFCI self-test may be performed in response to receiving an instruction from the controller 605.

In the illustrated embodiment, the controller 605 further includes a ground fault detection circuit 625. Although illustrated as being part (or a function block) of the controller 605, in other embodiments, the ground fault detection circuit 625 may be a separate component, removed from the controller 605. In such an embodiment, the ground fault detection circuit 625 may still be electrical and/or communicative communication with the controller 605.

The ground fault detection circuit 625 is configured to analyze electrical signals output by the sense transformer(s) 217. Moreover, the ground fault detection circuit 625 is configured to determine whether a ground fault has occurred based on the analysis of electrical signals received from the sense transformer(s) 217. In some embodiments, the ground fault detection circuit 625 is configured to transmit a signal indicative of the occurrence of a ground fault. In such embodiments, the controller 605 may be configured to trip the AM/PD device 100 in response to receiving the ground fault detection signal. For example, the controller 605 may control the interrupting device 210 (for example, to interrupt the flow of line power from the line terminal to the load terminal, such as by interrupting the flow of power from the power cable to the electrical plugs) in response to receiving the ground fault detection signal.

In some embodiments, the ground fault detection circuit 625 is further configured to perform a GFCI self-test. In such embodiments, the ground fault detection circuit 625 is configured to report the results of the GFCI self-test to the controller 605. In some embodiments, the ground fault detection circuit 625 is configured to perform the GFCI self-test periodically, intermittently, and/or on an on-demand basis. In some embodiments, the GFCI self-test may be performed in response to receiving an instruction from the controller 605.

Although illustrated as being two separate components, in other embodiments, the arc fault detection circuit 620 and the ground fault detection circuit 625 may be combined into a single circuit and/or component.

Figure 7:
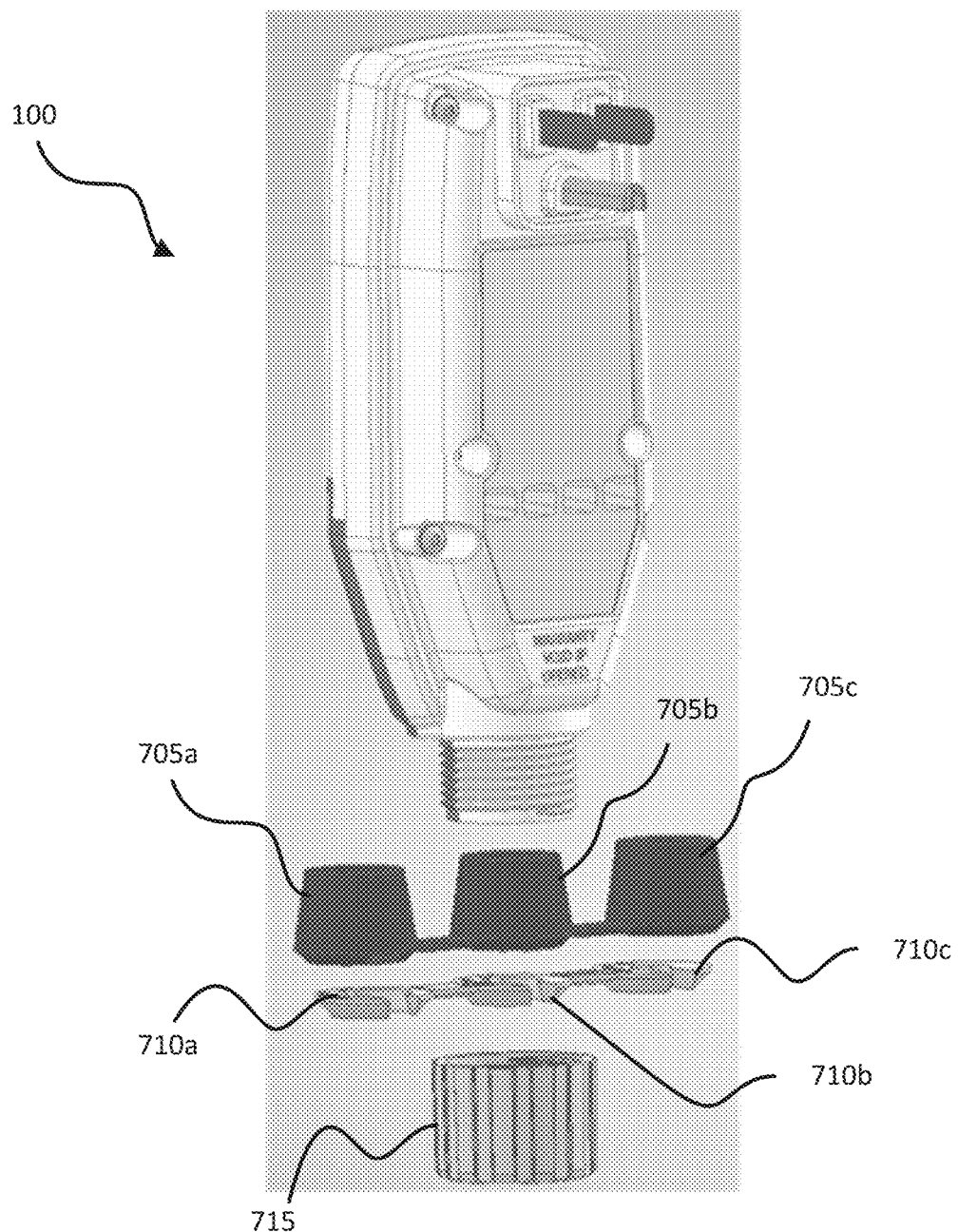
FIG. 7 is a rear perspective view of the AM/PD device of FIG. 1 according to some embodiments.

FIG. 7 illustrates the AM/PD device 100 according to some embodiments. As illustrated, the AM/PD device 100 may include one or more grommets (or stoppers) 705 (for example, grommets 705a-705c having a variety of diameters, for example, but not limited to 12 gauge, 14 gauge, and 16 gauge). The grommets 705, along with a washer (or ring) 710 (for example, washer 710a-710c) and cap 715 are configured to secure power cables (for example, power cable 815 of FIG. 8) having varying diameters to the AM/PD device 100. For example, grommet 705a, along with washer 710a, are configured for a first power cable having a first diameter, while grommet 705b, along with washer 710b, are configured for a second power cable having a second diameter, and grommet 705c, along with washer 710c, are configured for a third power cable having a third diameter. In other embodiments, more or less grommets and washers may be available for use with the AM/PD device 100. In some embodiments, the grommets 705, the washer 710, and the cap 715 form a waterproof, or water resistant, seal between the power cable and AM/PD device 100.

Figure 9:
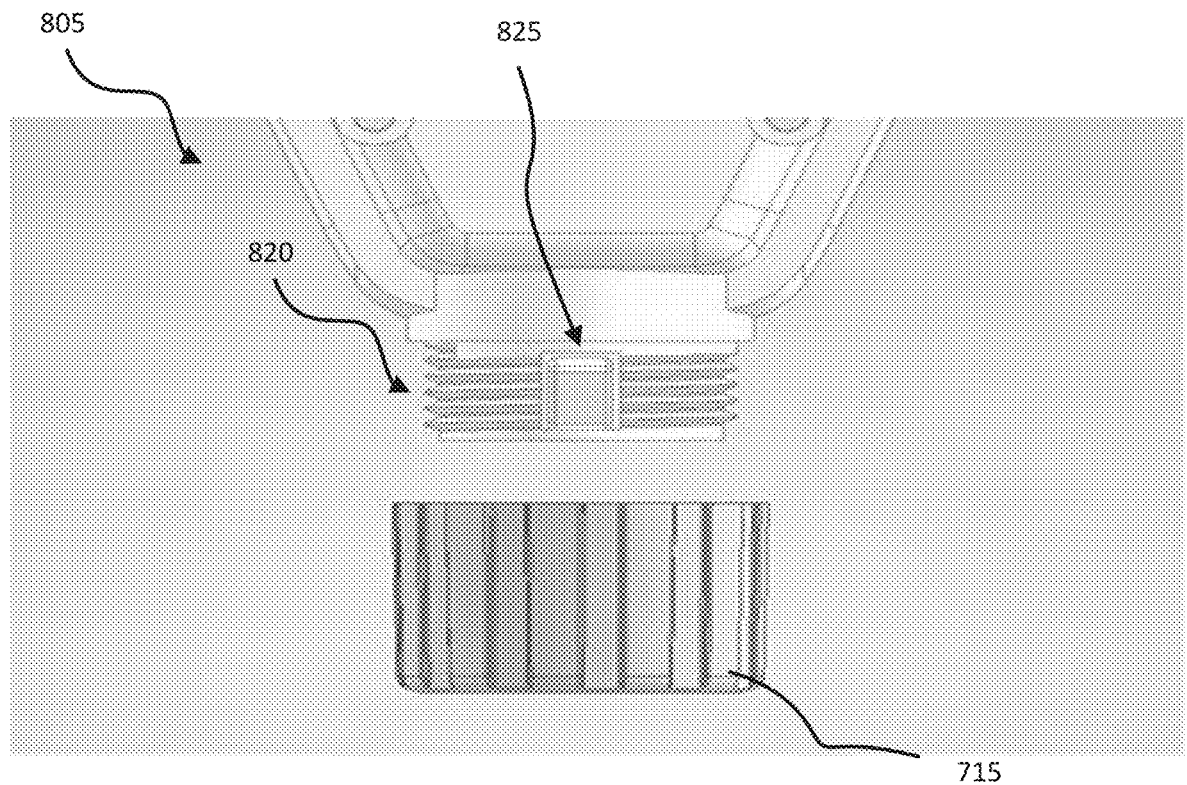
FIG. 9 is a rear view of a bottom portion of the AM/PD device of FIG. 1 according to some embodiments.

FIGS. 8 and 9 illustrate a bottom portion 805 of the AM/PD device 100 according to some embodiments. The bottom portion 805 includes an aperture 810 configured to receive the power cable 815. The bottom portion 805 further includes a threaded portion 820 and a compression tab 825. As the cap 715 is screwed onto the threaded portion 820, the compression tab 825 applies a force onto the power cable 815. In the illustrated embodiment, the compression tab 825 includes an angle, such that as the cap 715 is screwed on, displacement of the compression tab 825 increases in order to accommodate various sizes of the power cable 815.

Figure 10:
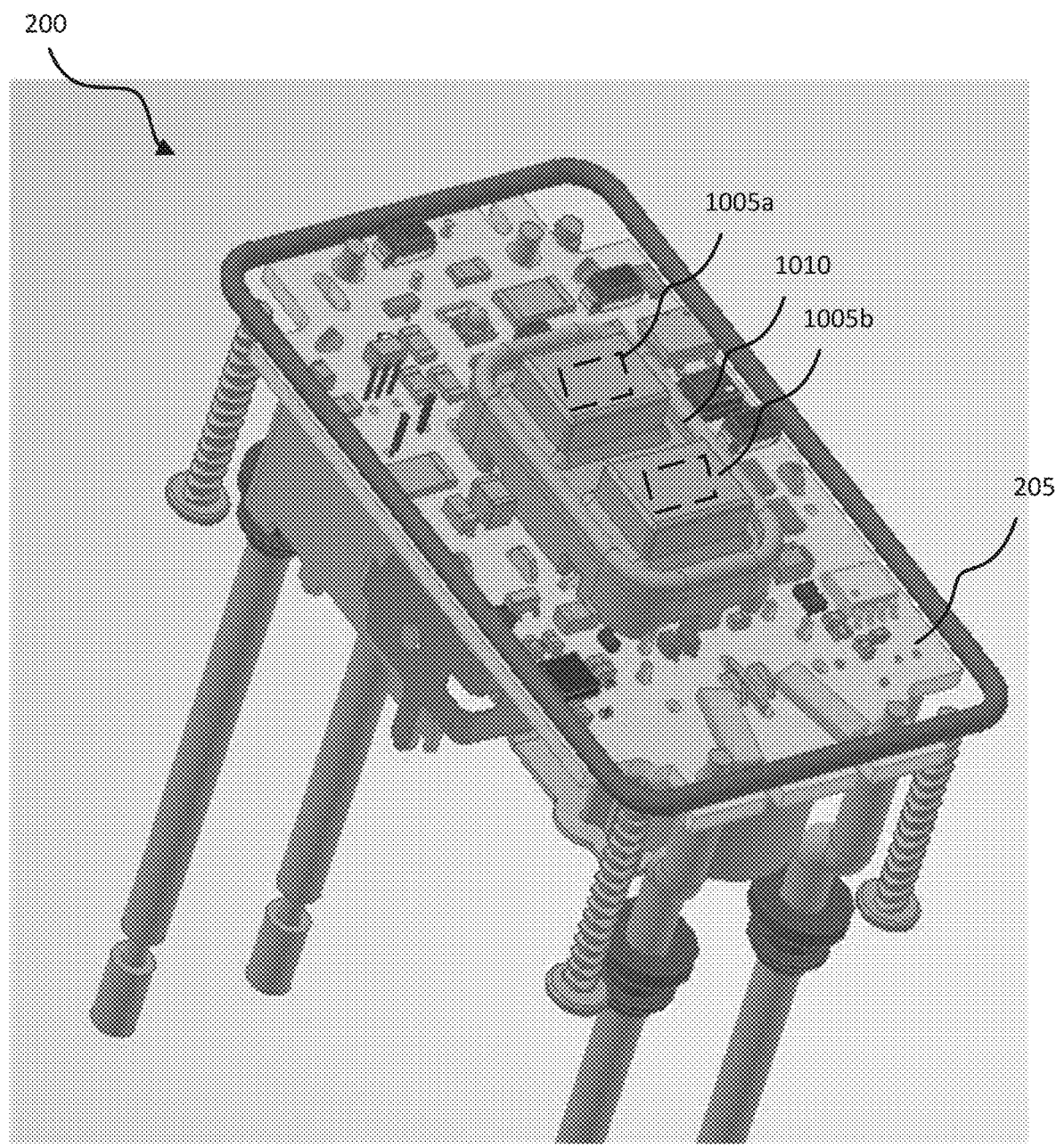
FIG. 10 is a perspective view of a bottom perspective view of a module of the AM/PD device of FIG. 1 according to some embodiments.

FIG. 10 illustrates a top side view of the module 200 with housings removed for illustrative purposes, according to some embodiments. In the illustrated embodiment, the one or more user-actuated inputs 120 include electronic switches 1005 (for example, a first electronic switch 1005a and a second electronic switch 1005b). In some embodiments, the electronic switches 1005 are located on the primary board 205. By placing the electronic switches 1005 directly on the primary board 205, the manufacturing process may be simplified, and less calibration may be necessary. In the illustrated embodiment, a user-interface (UI) gasket 1010 may be placed over the electronic switch 1005. The UI gasket 1010 may provide water proofing.

Figure 11A:
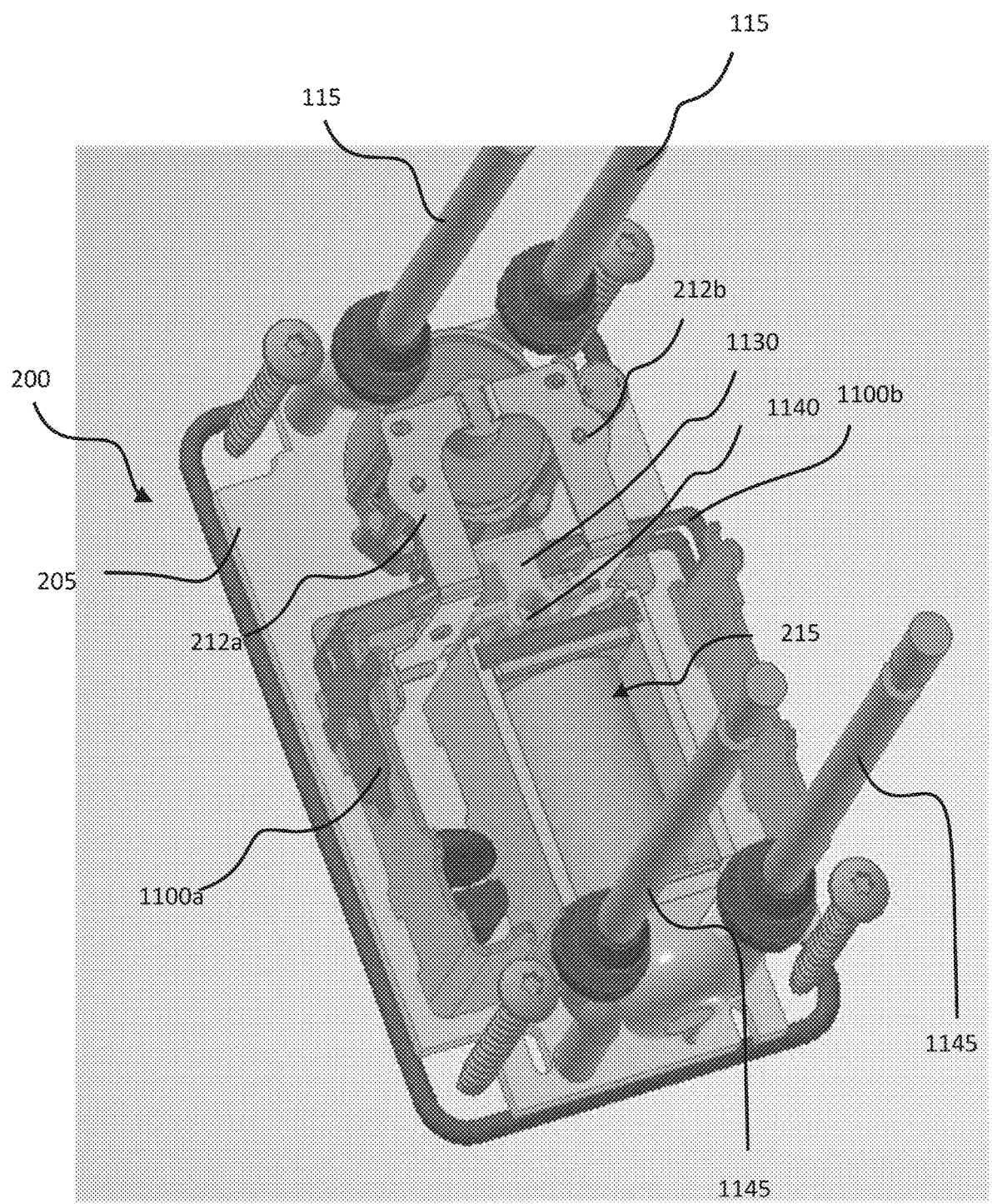
FIGS. 11A & 11B are top perspective views of a module of top perspective view of a module of the portable GFCI, GFCI/AFCI device of FIG. 1 according to some embodiments.
Figure 11B:
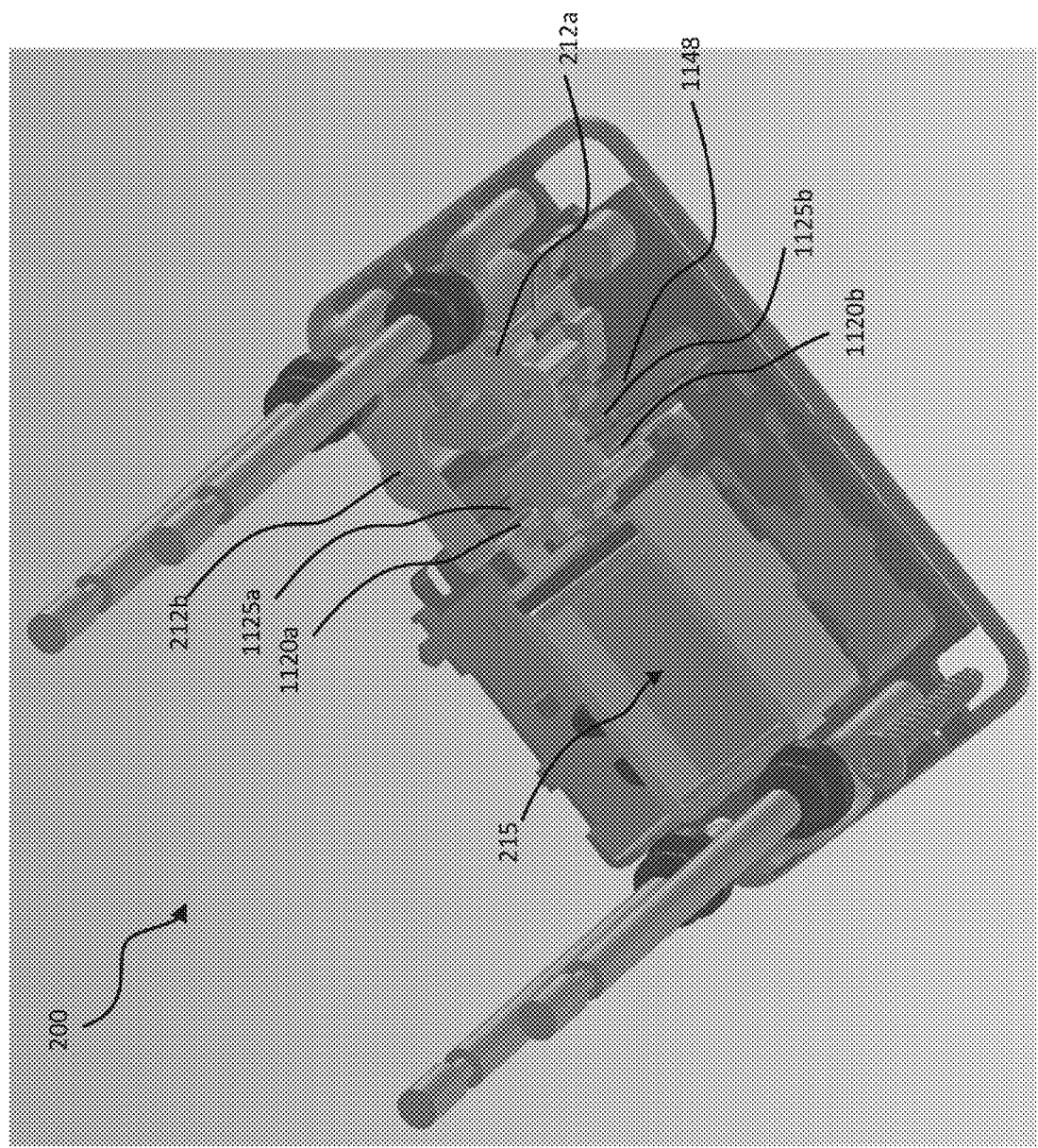

FIGS. 11A and 11B illustrate bottom side views of the module 200 with the housings removed for illustrative purposes, according to some embodiments. In some embodiments, the module 200 is configurable with the embodiment disclosed in FIG. 15A. The module 200 may further include one or more bus bars 1100 (for example, bus bar 1100a and bus bar 1100b). In the illustrated embodiment, the bus bars 1100 are mounted to the primary board 205 via a post 1105. For example, the post 1105 may include a tab 1110 received by an aperture 1115 of the bus bars 1100. In some embodiments, the bus bars 1100 are further directly coupled to the primary board 205 via riveting.

As illustrated in FIG. 11B, the bus bars 1100 may each include a bus bar contact 1120 (for example, bus bar contact 1120a and bus bar contact 1120b). Additionally, the first and second contact arms 212 may each include a movable contact 1125. In some embodiments, the movable contacts 1125 are coupled to brush arms of the first and second contact arms 212. The moveable contacts 1125 are configured to be in physical contact with the bus bar contacts 1120 when in the RESET mode. In some embodiments, the contact arms 212 further each include a slot for coupling the moveable contacts 1125 to the contact arms 212. In such an embodiment, the slots allow for heat dissipation and/or fine tuning of the placement of the moveable contacts 1125 (for example, in order to ensure proper connection with the contacts 1120 when in the RESET mode and a proper gap with contacts 1120 when the connection is open).

Figure 12:
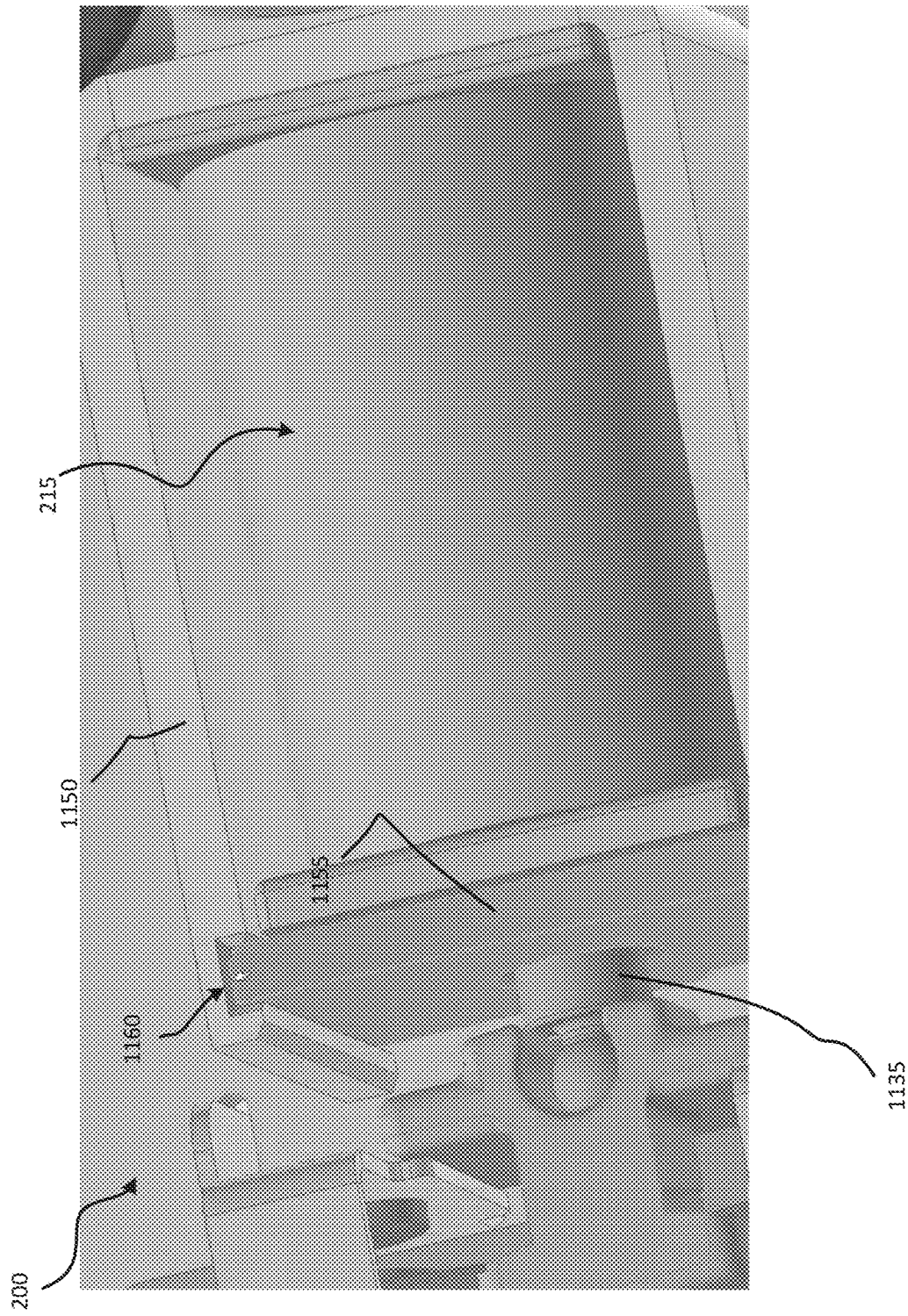
FIG. 12 is a perspective view of a coil assembly of top perspective view of a module of the AM/PD device of FIG. 1 according to some embodiments.

As illustrated in FIG. 12, the coil assembly (solenoid) 215 may be coupled to an actuating device 1130, which is coupled to the contact arms 212 (for example, via brush arms of the contact arms 212). In some embodiments, the coil assembly 215 is coupled to the actuating device 1130 via a plunger 1135. In the illustrated embodiment, the plunger 1135 is attached to the actuating device 1130 via a ball joint 1140. The ball joint 1140 may allow for compensation of any preload on either coil assembly 215 side or the actuating device 130 side.

In operation, when in the RESET mode, the plunger 1135 is extended from the coil assembly 215 in a first position. When in the first position, the moveable contacts 1125 are in physical contact with the bus bar contacts 1120, thus allowing current to flow from line (for example, lines/plugs 115) to the load (for example, load lines 1145).

When a fault is detected, the plunger 1135 (FIG. 12) moves to a second position (as shown in FIGS. 11A & 11B) wherein the moveable contacts 1125 are separated (via actuation device 1130) from the bus bar contacts 1120.

By placing the contacts 1125 and brush arms of the contact arms 212 toward the center of the module 200, and away from an interior wall of the housing 105, over temperature heat transfer to the housing conditions may be reduced, which prevents housing degradation. Furthermore, the bus bars 1100 may act as a heat sink configured to dissipate heat from the brush arms. Additionally, as illustrated in FIG. 11B, the module 200 may further include a plate 1148 located under between the primary board 205 and the contacts 1125 and brush arms of the contact arms 212. In some embodiments, the plate 1148 is comprised of metal and is configured to protect the primary board 205 from heat generated by the contacts 1125, brush arms of the contact arms 212, and/or bus bars 1100.

As illustrated in FIG. 12, the module 200 further includes a coil assembly frame 1150 configured to contain, or surround, the coil assembly 215. The coil assembly frame 1150 may include a coil assembly cap 1155 positioned within slots 1160 of the coil assembly frame 1150. As illustrated, in some embodiments, the slots 1160 extend the entire length of the coil assembly frame 1150. In some embodiments, the slots 1160 are at an angle other than ninety degrees (for example, less than ninety degrees). In such an embodiment, pressure is applied to the coil assembly cap 1155 in order to captivate the cap both physically and electrically to the coil assembly frame 1150.

Figure 13:
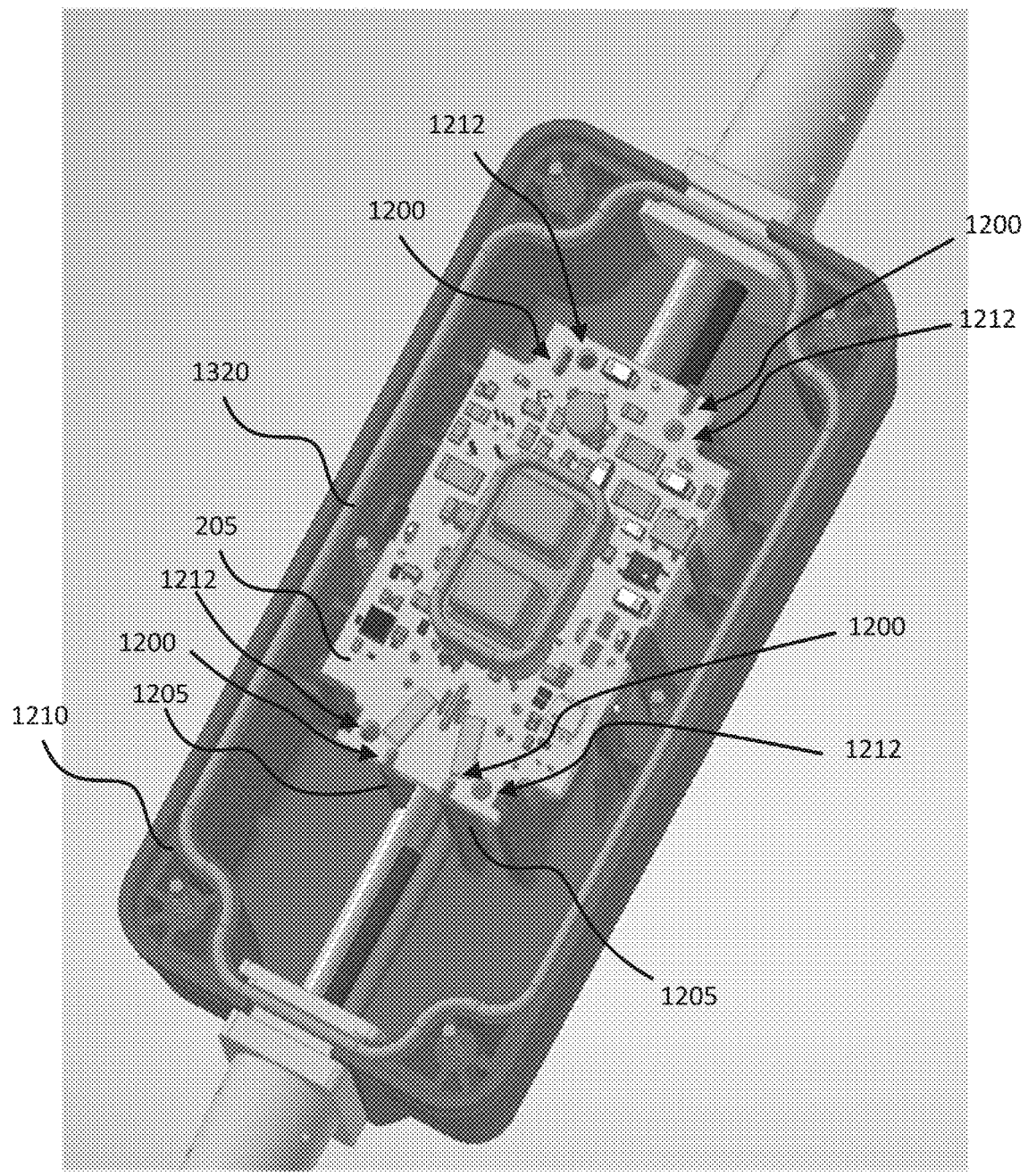
FIG. 13 is a front view of an interior portion of the front housing of the AM/PD device of FIG. 1 according to some embodiments.
Figure 14:
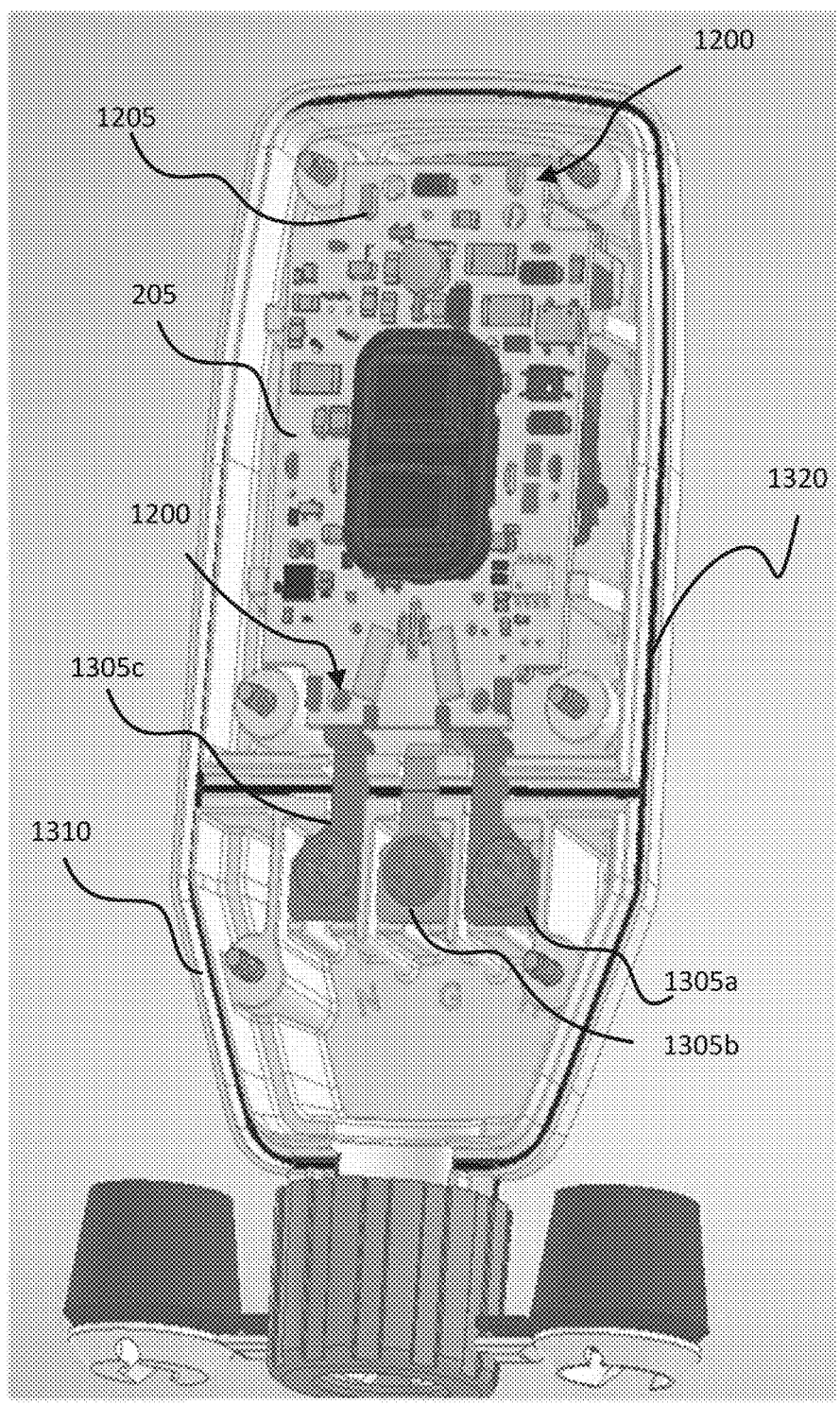
FIG. 14 is a front view of an interior portion of the front housing of the AM/PD device of FIG. 1 according to some embodiments.

As illustrated in FIG. 13, the primary board 205 may include a plurality of slots 1200 configured to mate with one or more posts 1205, 1305 of respective housings 1210, 1310 (for example, rear housings). The slots 1200 and posts 1205, 1305 provide the ability for the primary board 205 (and therefore carrier assembly 200) to be placed within a variety of types of housings 1210, 1310. As illustrated in FIG. 14, in some embodiments the slots 1200 of the primary board 205 is used to couple line terminals 1315a-1315c to the primary board 205. As further illustrated, the primary board 205 may further include a plurality of holes 1212. In some embodiments, the holes 1212 are configured to also mate with various posts 1205, 1305 of respective housings 1210, 1310 (for example, rear housings). Additionally, the holes 1212 may be used to connect wires for power lines (for example, as shown in the embodiment of FIG. 11B).

As illustrated in FIGS. 13-14, in some embodiments, the housing 1210, 1310 further include a gasket (or O-ring) 1320. The gasket 1320 is compressed between the housing 1210, 1310 and a respective front housing. In some embodiments, the gasket 1320 is further compressed via one or more fasteners (for example, screws) configured to couple a front housing to housing 1210, 1310. The gasket 130 may also be included in other embodiments disclosed herein, for example, but no limited to, the embodiment of FIG. 15A.

Figure 15A:
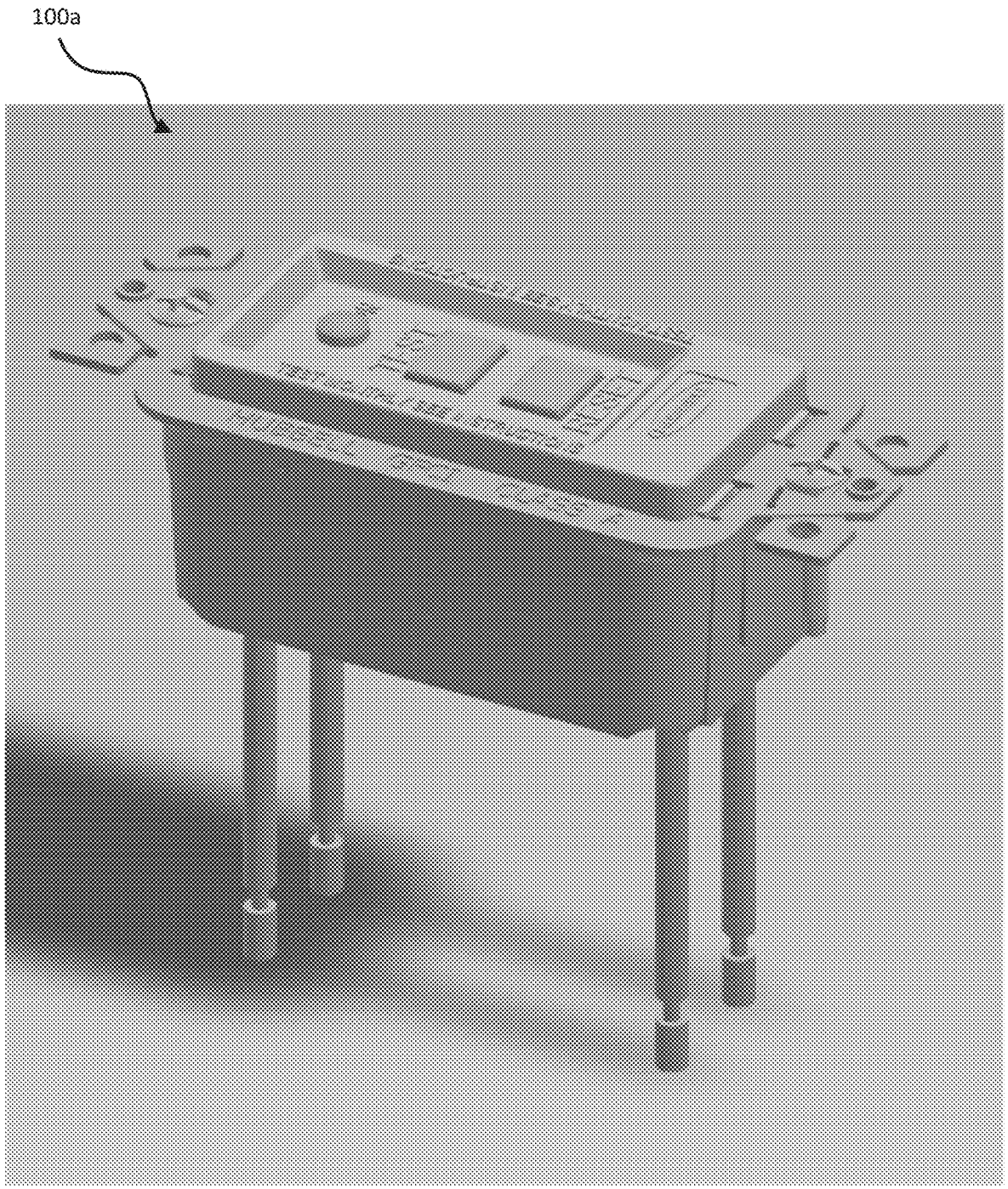
FIGS. 15A-15C are front perspective views of the AM/PD devices according to some embodiments, for example, the embodiments of FIGS. 11-14.
Figure 15B:
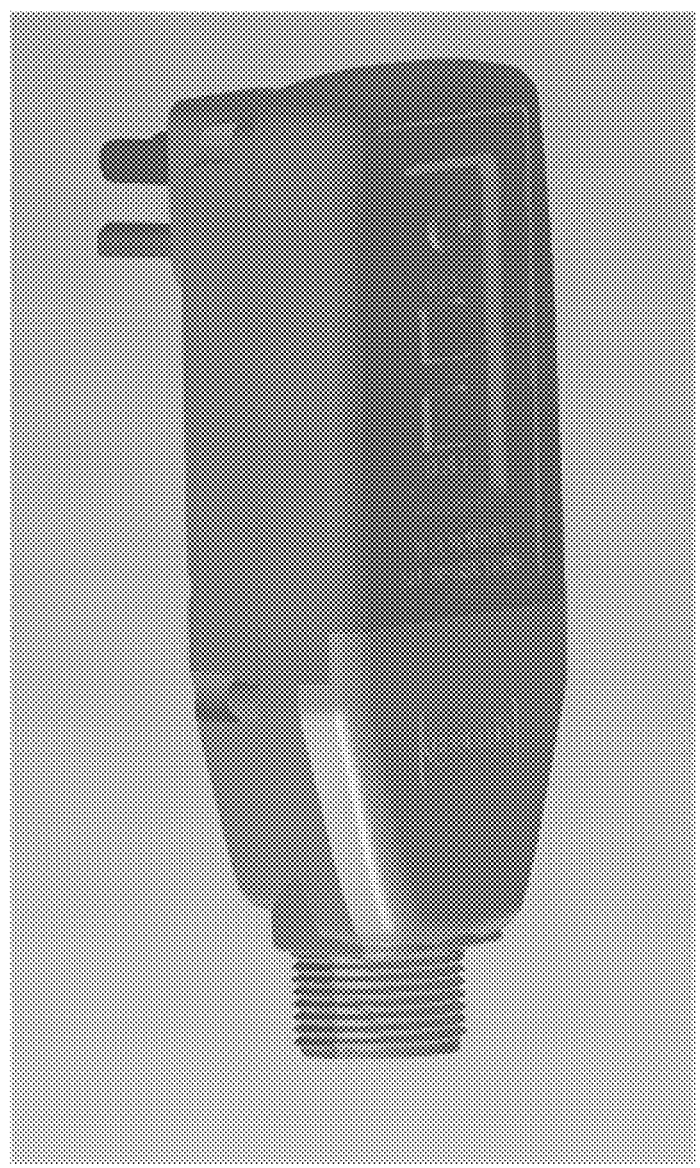
Figure 15C:
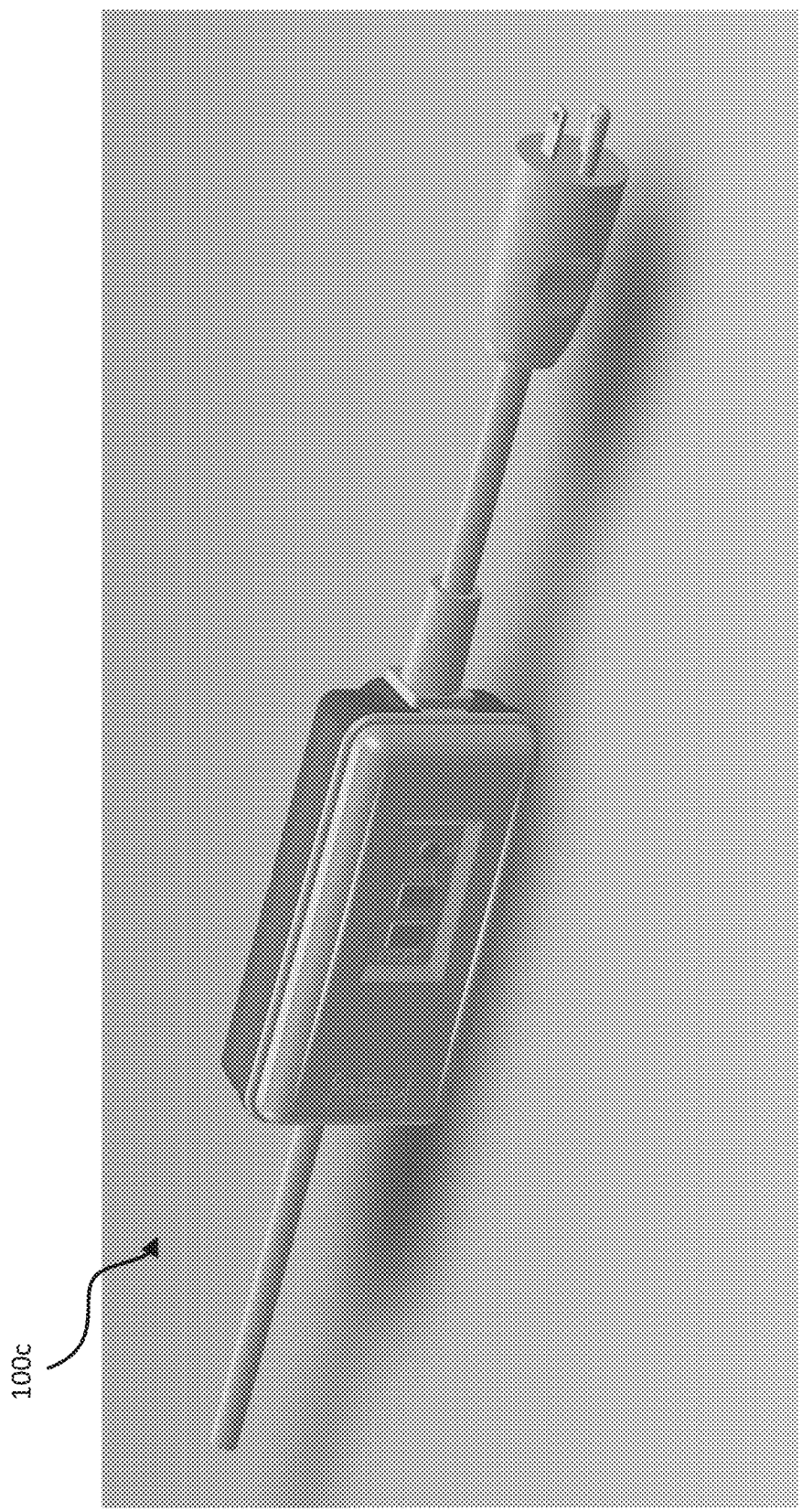

FIGS. 15A-15C illustrate various embodiments of the device 100 (including devices 100*a*-100*c*). Any of the above embodiments and/or features (for example, but not limited to, module 200) may be implemented into any device 100*a*-100*c*. For example, in the illustrated embodiment of FIG. 15A, device 100*a* is an in-wall unit configured to be permanently installed, in the illustrated embodiment of FIG. 15B, device 100*b* is a portable unit configured to be plugged into an electrical receptacle to receive line power, while in the illustrated embodiment of FIG. 15C, device 100*c* is an inline unit configured to be located in line with an power cord (for example, an extension cord).

Embodiments provide, among other things, a portable GFCI/AFCI device. Various features and advantages of the application are set forth in the following claims.

What is claimed is:

1. A module of a circuit interrupting device, the module comprising:
    a printed circuit board (PCB);
    a bus bar located on the PCB, the bus bar including one or more bus bar contacts;
    one or more contact arms having one or more moveable contacts configured to be in a first position and a second position, wherein when in the first position the one or more moveable contacts are in physical contact with the one or more bus bar contacts and when in the second position the one or more moveable contacts are physically separated from the one or more bus bar contacts;
    a plate located between the PCB and the one or more bus bar contacts and the one or more moveable contacts, wherein the plate is configured to protect the PCB from heat generated by the one or more bus bar contacts; and
    a coil assembly located on the PCB, the coil assembly coupled to an actuating device, the actuating device coupled to the one or more contact arms;
    wherein the coil assembly, via the actuating device, moves the one or more moveable contacts from the first position to the second position.

2. The module of claim 1, wherein the coil assembly is coupled to the actuating device via a plunger and a ball joint.

3. The module of claim 2, wherein the ball joint is configured to provide compensation of preload between the coil assembly and the actuating device.

4. The module of claim 1, wherein one or more bus bar contacts and the one or more moveable contacts are located toward a center of the PCB.

5. The module of claim 1, further comprising a coil assembly frame surrounding the coil assembly.

6. The module of claim 5, wherein the coil assembly frame includes a coil assembly cap located within one or more slots of the coil assembly frame.

7. The module of claim 1, wherein the module is configured to be placed in one of a plurality of auto-monitoring/power denial (AM/PD) devices.

8. The module of claim 7, wherein the plurality of AM/PD devices include at least one selected from a group consisting of an in-wall unit, a portable unit, and an inline unit.

* * * * *